Patented June 6, 1950

2,510,915

UNITED STATES PATENT OFFICE 2,510,915

HYDROGENATED CONDENSATE OF 10-HENDECENOIC ACID AND MALEIC ANHYDRIDE AND ESTERS THEREOF

Harold M. Spurlin, Marshallton, Del., assignor to Hercules Powder Company, Wilmington, Del., a corporation of Delaware No Drawing. Application May 18, 1946, Serial No. 670,842

8 Claims. (Cl. 260—404.8)

This invention relates to the hydrogenated condensate of 10-hendecenoic acid and maleic anhydride and to esters thereof. It relates more particularly to such esters which are improved plasticizers for cellulose derivatives.

It is well known that maleic acid anhydride may be condensed with conjugated unsaturated aliphatic compounds such as butadiene and isoprene and with conjugated drying oils such as tung oil to form adducts according to the Diels-Alder reaction. Drying oils containing unconjugated double bonds such as linseed oil and unsaturated higher fatty acids such as oleic acid, linoleic acid, have also been condensed with maleic anhydride to form condensates or adducts. In the case of those drying oils and acids having unconjugated double bonds it is believed that this reaction is also a Diels-Alder reaction, the double bonds shifting at the high temperature necessary for the reaction to a conjugated system. In the case of those compounds having only a single double bond, the condensation with maleic anhydride is less well understood. It has been postulated that the condensation occurs by the direct addition of the double bond in each compound to form a cyclic adduct.

Now in accordance with this invention it has been found that the condensate of 10-hendecenoic acid and maleic anhydride may be hydrogenated to form a completely saturated condensate, i. e., a condensate which is devoid of ethylenic unsaturation. It has further been found that esters of the hydrogenated condensate, which is chemically a tricarboxylic acid, have unusual properties as plasticizers for cellulose esters and ethers. Films formed from cellulose derivatives and these new esters have extremely high flexibilities, being much more flexible than films formed from cellulose derivatives with the prior art plasticizers.

The following examples are illustrative of the new esters which may be prepared. All parts and percentages are by weight unless otherwise specified.

EXAMPLE I

Five hundred parts of 10-hendecenoic acid were mixed with 294 parts of redistilled maleic anhydride and the reaction mixture was heated at 195±5° C. for 16½ hours in an atmosphere of carbon dioxide. The unreacted maleic anhydride and volatile by-products were distilled off under vacuum to a liquid temperature of 200° C. at 15 millimeters. The 10-hendecenoic acid-maleic anhydride condensate which remained as a residue amounted to 710 parts.

The crude 10-hendecenoic acid-maleic anhydride condensate, was esterified by refluxing in methanol solution in the presence of sulfuric acid as a catalyst. When the acid number of the esterification mixture hand fallen to 26.6 (sulfuric acid present would give an acid number of about 23), the product was dissolved in ether and the ethereal solution was washed with aqueous sodium bicarbonate solution and then with aqueous salt solution until the aqueous layer was neutral. The ethereal solution was then dried over anhydrous sodium sulfate and anhydrous calcium sulfate. After filtering off the drying agent, the ether was removed by distillation and the residue was fractionated in vacuo. On refractionation 335 parts of the trimethyl ester of 10-hendecenoic acid-maleic anhydride condensate, which was a pale yellow liquid boiling at 195–210° C. at 2 millimeters pressure, were obtained.

One hundred parts of this trimethyl ester of 10-hendecenoic acid-maleic anhydride condensate were hydrogenated at 58 pounds per square inch of hydrogen in the presence of 5 parts of platinum dioxide catalyst for 11½ hours at room temperature. The catalyst was filtered off and the residue was a water-white mobile liquid which had the following analysis:

| | Found | Calculated |
|---|---|---|
| Saponification Number (DEG) | 459 | 488.5 |
| Acid Number | 2.2 | 0 |
| Bromine Number | 0.5 | 0 |
| Percent Methoxyl | 26.2 | 27.0 |

EXAMPLE II

The trimethyl ester of 10-hendecenoic acid-maleic anhydride condensate, prepared as described in Example I, (160 parts) was hydrogenated at 58 pounds per square inch at 25–26° C. using 0.8 part of platinum dioxide catalyst for 16½ hours. The catalyst was removed by filtration and the hydrogenated trimethyl ester of 10-hendecenoic acid-maleic anhydride condensate (159 parts) which was obtained had a saponification number of 480, a bromine number of 2 and an acid number of 3.2.

EXAMPLE III

A crude 10-hendecenoic acid-maleic anhydride condensate prepared as in Example I was esterified by refluxing an ethanol solution of it in the presence of sulfuric acid as a catalyst. When the acid number of the reaction mixture had fallen to a value approaching that of the sulfuric acid present the excess ethanol was distilled in vacuo. The crude product was dissolved in ether and the ethereal solution was washed with aqueous sodium bicarbonate solution and then with aqueous salt solution until the aqueous layer was neutral. The ethereal solution was then dried over anhydrous sodium sulfate and anhydrous calcium sulfate. The drying agent

*M. I. T. fold values*

|  | Average Number of Double Folds | | | | |
| --- | --- | --- | --- | --- | --- |
|  | Original | 8 hrs. | 48 hrs. | 100 hrs. | 300 hrs. |
| Trimethyl ester of 10-hendecenoic acid-maleic anhydride condensate | 600±175 | 400±100 | 120±25 | Brittle | |
| Trimethyl ester of hydrogenated 10-hendecenoic acid-maleic anhydride condensate. | 1150±470 | 800±200 | 560±130 | 420±60 | 300±100 | was filtered and the ether removed by distillation and the residue was fractionated in vacuo to give, as a middle cut, the triethyl ester of 10-hendecenoic acid-maleic anhydride condensate.

One hundred parts of this triethyl ester of 10-hendecenoic acid-maleic anhydride condensate was hydrogenated at 58 pounds per square inch of hydrogen in the presence of 5 parts of platinum dioxide for 12 hours at room temperature. The catalyst was filtered to give, as a nearly colorless liquid, the hydrogenated triethyl ester of 10-hendecenoic acid-maleic anhydride coondensate.

EXAMPLE IV

The monomethyl ether of ethylene glycol, sold under the trade name of Methyl Cellosolve, (800 parts) was heated to boiling, and the first 100 parts of the distillate discarded. The remaining solvent was cooled and 1 part of sodium was added. After all the sodium had reacted, 100 parts of the trimethyl ester of hydrogenated 10-hendecenoic acid-maleic anhydride condensate prepared as in Example I was added. After standing overnight at room temperature the solution was heated to boiling and the methanol distilled at atmospheric pressure. The excess monomethyl ether of ethylene glycol was then distilled in vacuo. The crude product was dissolved in hexane and this solution was washed with 5% hydrochloric acid, distilled water, 5% sodium bicarbonate solution, and finally with distilled water. The hexane solution was decolorized with Darco and the solvent distilled in vacuo to leave the tri-β-methoxyethyl ester of hydrogenated 10-hendecenoic acid-maleic anhydried condensate as a yellow oil.

The esters of the hydrogenated 10-hendecenoic acid-maleic anhydride condensate are compatible with cellulose esters such as cellulose acetate, nitrocellulose, etc., and with cellulose ethers such as ethyl cellulose. The trimethyl ester of the hydrogenated 10-hendecenoic acid-maleic anhydride condensate was found to be compatible with cellulose acetate at a film-former-plasticizer ratio of from 1:1 to 7:3 and with nitrocellulose and with ethyl cellulose at a film-former-plasticizer ratio of 1:1. The following examples are illustrative of cellulose derivative compositions containing these new esters.

EXAMPLE V

The trimethyl ester of hydrogenated 10-hendecenoic acid-maleic anhydride condensate, prepared as described in Example I, was compounded with cellulose acetate at a ratio of 10:5 and compared with the unhydrogenated tri- methyl ester at the same ratio. Films of each were cast from an acetone-alcohol solution on glass plates and dried at room temperature for 18 hours; then stripped and dried at 70° C. for 2 hours. The plasticized films were tested for flexibility and discoloration initially, and after exposure on the Fade-Ometer for varying periods of time. Results of these tests are given in the following table:

The films containing the unhydrogenated ester became brittle after 100 hours Fade-Ometer exposure while the ones containing the hydrogenated ester were still flexible after 300 hours exposure. There was no discoloration of the film containing the hydrogenated ester even after 300 hours exposure.

EXAMPLE VI

Films of the trimethyl ester of the hydrogenated 10-hendecenoic acid-maleic anhydride condensate, prepared as described in Example V, were tested for their flexibility at −20° C. and found to have an M. I. T. flexibility of 50±15 under these conditions.

The new esters in accordance with this invention are prepared by reacting 10-hendecenoic acid with maleic acid anhydride, esterifying the condensate so produced, and then saturating the ester of the condensate by catalytic hydrogenation. They may also be prepared by hydrogenating the condensate before esterification or by reacting an ester of 10-hendecenoic acid with maleic anhydride or with a diester of maleic acid.

The 10-hendecenoic acid, which is also commonly referred to as undecylenic acid, may be obtained by cracking ricinoleic acid or its salts or esters.

The reaction of 10-hendecenoic acid with maleic acid anhydride is readily carried out by heating the reactants to a temperature of about 150° C. to about 300° C. until the reaction is complete. An excess of maleic acid anhydride may be employed to bring about a more complete reaction since it may be removed from the reaction mixture by distillation. As pointed out above, either the free acid or an ester of 10-hendecenoic acid may be condensed with the maleic acid anhydride. Instead of maleic acid anhydride, the acid or ester of 10-hendecenoic acid may be condensed with maleic acid or with a diester of maleic acid to form these condensates. If the esters of both the 10-hendecenoic acid and maleic acid are used it is not necessary to further esterify the condensate. However, if only one of these compounds is used in the form of its ester a partial ester of the condensate is formed and if the triester is desired, the partial ester must then be further esterified.

The crude 10-hendecenoic acid-maleic anhydride condensate may be esterified by any of the well known methods without purification of the condensate before esterification. The esterification may be accomplished by refluxing a solution of the condensate in the desired alcohol in the presence of an acid catalyst such as concentrated sulfuric acid or by heating the condensate with the desired alcohol under pressure at elevated temperatures. Alcohols which may be used to esterify the condensate include such alcohols as methanol, ethanol, propanol, furfuryl alcohol, glycols such as ethylene glycol, diethylene glycol, etc., alkyl ethers of glycols, such as the methyl and ethyl ethers of diethylene glycol, alkyl glycolates, such as methyl and ethyl glycolate, etc.

In accordance with this invention the esters of 10-hendecenoic acid-maleic anhydride condensate may be saturated by hydrogenating in the presence of a hydrogenation catalyst. Any active hydrogenation catalyst may be used for hydrogenation reaction, as, for example, a noble metal catalyst such as Adams platinum oxide, reduced platinum, reduced palladium, or an active base metal catalyst such as reduced nickel, Raney nickel, Raney cobalt, etc. The catalyst may be supported, if desired, on a suitable support such as pumice, kieselguhr, silica gel, carbon, etc. When platinum and palladium catalysts are used the hydrogenation may be carried out at low temperatures such as about 25° C. to about 100° C. and at low hydrogen pressures such as from about atmospheric to about 1000 pounds per square inch. In the case of the nickel and cobalt catalysts, temperatures of from about 125° C. to about 250° C. may be utilized as well as hydrogen pressures of above 100 pounds per square inch, preferably about 700 to about 5000 pounds per square inch. As pointed out above the hydrogenation reaction may be carried out on the acid condensate before esterification.

The esters of the hydrogenated 10-hendecenoic acid-maleic anhydride condensate are, in general, colorless mobile liquids of low viscosity and low vapor pressure. They may be purified by distillation in vacuum at reduced pressures or they may be extracted with dilute solutions of alkali to remove any acidic impurities and then treated with decolorizing agents such as activated carbons and clays.

The 10-hendecenoic acid-maleic anhydride condensate formed by heating these two materials together is believed to be an addition product, the addition taking place at the double bond of the maleic anhydride. This condensate when esterified is then believed to yield the triester of 3-vinyldecane-1,2,10-tricarboxylate. Hydrogenation of this material is believed to form the saturated compound, a triester of 3-ethyldecane-1,2,10-tricarboxylic acid which may also be called the hydrogenated triester of hendecenoic acid-maleic anhydride condensate. However, since it is not known that the addition of maleic anhydride to the 10-hendecenoic acid actually takes place at the double bond of the maleic anhydride, these compounds are referred to as the 10-hendecenoic-maleic anhydride condensate and the hydrogenated 10-hendecenoic-maleic anhydride condensate respectively.

The triesters of the hydrogenated 10-hendecenoic acid-maleic anhydride condensate have an excellent plasticizing action on cellulose derivatives, as for example cellulose esters such as nitrocellulose, cellulose acetate, cellulose butyrate, etc., and cellulose ethers such as ethyl cellulose, etc., and on other plastic materials such as polyvinyl chloride, etc. These esters are of particular value in the production of cellulose derivative films since they impart very high flexibilities to such films. As may be seen from the foregoing examples, this high flexibility is retained even on prolonged exposure to ultraviolet light. In addition to the high degree of flexibility which these esters impart to films, they are also advantageous plasticizers in that they are colorless liquids of low viscosity and low vapor pressure. Cellulose derivative compositions containing these esters as the plasticizers therefore do not discolor on exposure to ultraviolet light. These esters are compatible with cellulose acetate at a ratio of film-former to plasticizer of from 1:1 to 7:3.

Films formed from cellulose acetate and the trialkyl esters of the hydrogenated 10-hendecenoic-maleic anhydride condensate are of particular value in packaging, movie films, etc., due to their high flexibility and freedom from discoloration on exposure to ultraviolet light.

What I claim and desire to protect by Letters Patent is:

1. The product produced by condensing at from about 150° C. to about 300° C. a material of the group consisting of maleic acid, maleic acid anhydride, and aliphatic alcohol esters of maleic acid with a material of the group consisting of 10-hendecenoic acid and aliphatic alcohol esters thereof and treating the resulting condensate with hydrogen in the presence of an active hydrogenation catalyst until substantially all ethylenic unsaturation has been removed, said aliphatic alcohol wherever mentioned herein being selected from the group consisting of lower alkanols, lower alkylene glycols, poly (lower alkylene glycols), lower alkyl ethers of said glycols and polyglycols, and lower alkyl glycolates.

2. The product produced by condensing at from about 150° C. to about 300° C. a material of the group consisting of maleic acid, maleic acid anhydride, and aliphatic alcohol esters of maleic acid with a material of the group consisting of 10-hendecenoic acid and aliphatic alcohol esters thereof, reacting the resulting condensate with an aliphatic alcohol to form a triester, and treating said triester with hydrogen in the presence of an active hydrogenation catalyst until substantially all ethylenic unsaturation has been removed, said aliphatic alcohol wherever mentioned herein being selected from the group consisting of lower alkanols, lower alkylene glycols, poly (lower alklyene glycols), lower alkyl ethers of said glycols and polyglycols, and lower alkyl glycolates.

3. The product produced by condensing at from about 150° C. to about 300° C. maleic acid anhydride with 10-hendecenoic acid, reacting the resulting condensate with an aliphatic alcohol to form a triester, and treating said triester with hydrogen in the presence of an active hydrogenation catalyst until substantially all ethylenic unsaturation has been removed, said aliphatic alcohol wherever mentioned herein being selected from the group consisting of lower alkanols, lower alkylene glycols, poly (lower alkylene glycols), lower alkyl ethers of said glycols and polyglycols, and lower alkyl glycolates.

4. The product produced by condensing at from about 150° C. to about 300° C. maleic acid anhydride with 10-hendecenoic acid, reacting the resulting condensate with a lower alkanol to form a triester, and treating said triester with hydrogen in the presence of an active hydrogenation catalyst until substantially all ethylenic unsaturation has been removed.

5. The product produced by condensing at from about 150° C. to about 300° C. maleic acid anhydride with 10-hendecenoic acid, reacting the resulting condensate with ethyl alcohol to form a triester, and treating said triester with hydrogen in the presence of an active hydrogenation catalyst until substantially all ethylenic unsaturation has been removed.

6. The product produced by condensing at from about 150° C. to about 300° C. maleic acid anhydride with 10-hendecenoic acid, reacting the resulting condensate with methyl alcohol to form a triester, and treating said triester with hydrogen in the presence of an active hydrogenation catalyst until substantially all ethylenic unsaturation has been removed.

7. The product produced by condensing at from about 150° C. to about 300° C. maleic acid anhydride with 10-hendecenoic acid, reacting the resulting condensate with tri-$\beta$-methoxyethyl alcohol to form a triester, and treating said triester with hydrogen in the presence of an active hydrogenation catalyst until substantially all ethylenic unsaturation has been removed.

8. The product produced by condensing at from about 150° C. to about 300° C. a material of the group consisting of maleic acid, maleic acid anhydride, and aliphatic alcohol esters of maleic acid with a material of the group consisting of 10-hendecenoic acid and aliphatic alcohol esters thereof, treating the resulting condensate with hydrogen in the presence of an active hydrogenation catalyst until substantially all ethylenic unsaturation has been removed, and reacting said hydrogenated condensate with an aliphatic alcohol to form a triester, said aliphatic alcohol wherever mentioned herein being selected from the group consisting of lower alkanols, lower alklyene glycols, poly (lower alkylene glycols), lower alkyl ethers of said glycols and polyglycols, and lower alkyl glycolates.

HAROLD M. SPURLIN.

REFERENCES CITED

The following references are of record in the file of this patent:

UNITED STATES PATENTS

| Number | Name | Date |
|---|---|---|
| 1,972,092 | Graves et al. | Dec. 8, 1932 |
| 1,969,482 | Smith | Aug. 7, 1934 |
| 2,117,827 | Smith | May 17, 1938 |
| 2,188,882 | Clocker | Jan. 30, 1940 |
| 2,188,883 | Clocker | Jan. 30, 1940 |
| 2,188,885 | Clocker | Jan. 30, 1940 |